United States Patent
Mao (10) Patent No.: US 12,301,834 B2
(45) Date of Patent: May 13, 2025

(54) VIDEO CODING METHOD AND APPARATUS, COMPUTER-READABLE MEDIUM AND ELECTRONIC DEVICE

(71) Applicant: TENCENT TECHNOLOGY (SHENZHEN) COMPANY LIMITED, Shenzhen (CN)

(72) Inventor: Junling Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 34 days.

(21) Appl. No.: 18/137,950

(22) Filed: Apr. 21, 2023

(65) Prior Publication Data
US 2023/0262232 A1  Aug. 17, 2023

Related U.S. Application Data

(63) Continuation of application No. PCT/CN2022/097341, filed on Jun. 7, 2022.

(30) Foreign Application Priority Data

Aug. 2, 2021 (CN) .......................... 202110883015.7

(51) Int. Cl.
*H04N 7/12* (2006.01)
*H04N 19/115* (2014.01)
(Continued)

(52) U.S. Cl.
CPC ......... *H04N 19/159* (2014.11); *H04N 19/115* (2014.11); *H04N 19/172* (2014.11)

(58) Field of Classification Search
CPC .. H04N 19/159; H04N 19/115; H04N 19/172; H04N 19/65; H04N 21/2408;
(Continued)

(56) References Cited

U.S. PATENT DOCUMENTS

| 7,369,709 B2 * | 5/2008 | Hsu ........................ H04N 19/86 |
| | | 375/240.18 |
| 2007/0298811 A1 * | 12/2007 | Hartman ............... H04W 24/02 |
| | | 455/452.2 |

(Continued)

FOREIGN PATENT DOCUMENTS

| CN | 101527834 A | 9/2009 |
| CN | 104125429 A | 10/2014 |

(Continued)

OTHER PUBLICATIONS

The World Intellectual Property Organization (WIPO) International Search Report for PCT/CN2022/097341 Aug. 23, 2022 11 Pages (including translation).

*Primary Examiner* — Gims S Philippe
(74) *Attorney, Agent, or Firm* — ANOVA LAW GROUP PLLC (57) ABSTRACT

This application belongs to the technical field of communication, and particularly relates to a video coding method and apparatus, a computer-readable medium and an electronic device. The video coding method, executed by the electronic device, includes obtaining historical signal strength information within a historical time period, the historical signal strength information representing a video transmission wireless network signal strength corresponding to each moment of the historical time period; predicting strength information of a next key frame according to the historical signal strength information, the strength information of the next key frame representing a wireless network signal strength for transmitting the next key frame; and determining a target data volume of the next key frame according to the strength information of the next key frame, and performing intraframe coding on the next key frame according to the target data volume.

20 Claims, 7 Drawing Sheets

(51) Int. Cl.
*H04N 19/159* (2014.01)
*H04N 19/172* (2014.01)

(58) Field of Classification Search
CPC ............. H04N 21/2662; H04N 19/164; H04N 19/166; H04N 21/2402; H04N 21/6131; H04N 21/6181
See application file for complete search history.

(56) References Cited

U.S. PATENT DOCUMENTS

2014/0233413 A1* 8/2014 Dahod .................... H04L 65/80
    370/252
2019/0014021 A1* 1/2019 Huang ................. H04W 48/18
2022/0329535 A1* 10/2022 Li .......................... H04L 45/22

FOREIGN PATENT DOCUMENTS

| CN | 106162257 A | 11/2016 |
| CN | 106713913 A | 5/2017 |
| CN | 108495142 A | 9/2018 |

\* cited by examiner

VIDEO CODING METHOD AND APPARATUS, COMPUTER-READABLE MEDIUM AND ELECTRONIC DEVICE

RELATED APPLICATIONS

This application is a continuation of PCT Application No. PCT/CN2022/097341, filed on Jun. 7, 2022, which in turn claims priority to Chinese Patent Application No. 202110883015.7 entitled "VIDEO CODING METHOD AND APPARATUS, COMPUTER-READABLE MEDIUM AND ELECTRONIC DEVICE" filed to China Patent Office on Aug. 2, 2021. The two applications are both incorporated by reference in their entirety.

FIELD OF THE TECHNOLOGY

This application belongs to the technical field of communication, and particularly relates to a video coding method, a video coding apparatus, a computer-readable medium and an electronic device.

BACKGROUND OF THE DISCLOSURE

One objective of video coding is to eliminate redundant information existing among video signals. With the continuous development of multimedia digital video applications, since existing transmission network bandwidths and storage resources cannot support the original video data volume, compressed videos data are suitable for transmission in a network. Video coding technology has become one of the hot spots in researches and industrial applications. In addition, with the development of artificial intelligence and incoming of the 5G era, the increasing video data volume raises the requirements for a video coding standard.

However, a video coding method under the 5G private network has the problem of a long transmission delay.

SUMMARY

An objective of this application is to provide a video coding method and apparatus, a computer-readable medium and an electronic device, which solve the technical problems such as transmission delay in the related art at least to a certain extent.

Other features and advantages of this application become obvious through the following detailed descriptions or partially learned through the practice of this application.

One aspect of this embodiment of this application provides a video coding method. The video coding method, executed by the electronic device, includes obtaining historical signal strength information within a historical time period, the historical signal strength information representing a video transmission wireless network signal strength corresponding to each moment of the historical time period; predicting strength information of a next key frame according to the historical signal strength information, the strength information of the next key frame representing a wireless network signal strength for transmitting the next key frame; and determining a target data volume of the next key frame according to the strength information of the next key frame, and performing intraframe coding on the next key frame according to the target data volume.

Another aspect of this embodiment of this application provides a non-transitory computer-readable medium, storing a computer program thereon, the computer program, when executed by a processor, implementing the video coding method as in the above technical solution.

Another aspect of this embodiment of this application provides an electronic device, including: a processor; and a memory, configured to store executable instructions of the processor; the processor being configured to execute the video coding method as in the above technical solution via executing the executable instructions.

In the technical solution provided by this embodiment of this application, the strength information of the next key frame is predicted through the historical signal strength information, and the target data volume of the next key frame is determined according to the predicted strength information of the next key frame. The target data volume is determined in advance before coding of a frame, then coding is performed within the next key frame according to the target data volume, and therefore transmission of the key frame may be completed within one uplink slot without waiting for one frame period, thereby reducing a transmission delay.

It is to be understood that the above general descriptions and later detailed descriptions are merely exemplary and illustrative, and cannot limit this application.

BRIEF DESCRIPTION OF THE DRAWINGS

The accompanying drawings herein are incorporated into the specification and constitute a part of the specification, show embodiments consistent with this application, and together with the specification, are used to explain the principle of this application. Apparently, the accompanying drawings in the following description are only some embodiments of this application, and for a person of ordinary skill in the art, on the premise of no creative labor, other accompanying drawings can further be obtained from these accompanying drawings.

DESCRIPTION OF EMBODIMENTS

Exemplary embodiments will now be described more thoroughly with reference to the accompanying drawings. However, the exemplary embodiments may be implemented in multiple forms, and are not to be understood as being limited to the examples described herein. On the contrary, providing these embodiments make this application more comprehensive and complete, and comprehensively communicates the concept of the exemplary embodiments to a person of skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that the technical solutions in this application may be implemented without one or more of the particular details, or another method, unit, apparatus, or step may be used. In other cases, well-known methods, apparatuses, embodiments, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

With the development of artificial intelligence and incoming of the 5G era, the increasing video data volume raises the requirements for a video coding standard. For the same video, the higher the compression ratio of video coding, the higher compression distortion, and the poorer the video quality experienced by users; and the lower the compression ratio, the higher the cost of video storage and transmission. It is difficult to find a balance between the two. As such, an adaptive coding technology based on network awareness has become a key technology in audio and video real-time communication.

In a 5G network, uplink and downlink wireless transmission resources are configured by utilizing different frames, uplink frames only allow transmission of uplink data (from terminals to base stations), and downlink frames only allow transmission of downlink data (from base stations to terminals).

Figure 1:
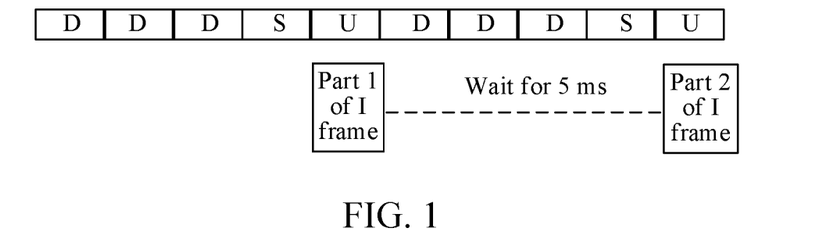
FIG. 1 shows a schematic diagram of a 5G network data transmission process.

Referring to FIG. 1, FIG. 1 shows a schematic diagram of a 5G network data transmission process. A currently common 5G network has a frame configuration of 3D1U, that is, there are three downlink frames, one uplink frame (U frame) and one special subframe in a time period of 5 ms, with a time length of each frame being 1 ms. An uplink data volume that may be borne by one U frame is specifically related to a signal strength from a terminal to a base station, scheduling of the base station, and the like. When I frame data of an uplink video stream of the terminal cannot complete transmission on the current U frame, the I frame data will be scheduled to a next U frame or the one after the next U frame for uplink transmission, until transmission of all data is completed. Referring to FIG. 1, if only the first part Part1 of the I frame data is uploaded on the current U frame, a remaining second part Part2 has to be scheduled to the next U frame for uplink transmission, and it needs to wait for another frame period of 5 ms. Therefore, the existing 5G network has the technical problem of transmission delay during video transmission.

A method to solve the problem of transmission delay problem is to apply an adaptive coding technology based on network awareness.

Existing adaptive coding mainly includes two methods. The first is direct feedback adjustment, in which coding parameters are directly adjusted mainly based on the situations of delay and packet loss fed back by a sending end. The second is predictive adjustment based on a routing congestion model, that is, delay and a packet loss rate of a network are predicted for adaptive coding adjustment by utilizing Wiener filtering or temporal sequence prediction or the like on the basis of delay and delay jitter fed back by the sending end. A prediction model is mainly for a public network scene, and considering that network delay is mainly caused by router forwarding, during router congestion, there will be large delay jitter, and even packet loss is possible. However, the two adaptive coding methods mentioned above both have problems, specifically, in the method of direct adjustment according to feedback of a receiving end, encoder adjustment has certain hysteresis, while the method of predictive adjustment based on the routing congestion model fails to adapt to a 5G private network scene dominated by 5G radio delay.

With respect to the above situation, this application provides a corresponding coding method which is designed for the 5G radio characteristic and used for relieving the delay problem under the 5G private network scene.

Figure 2:
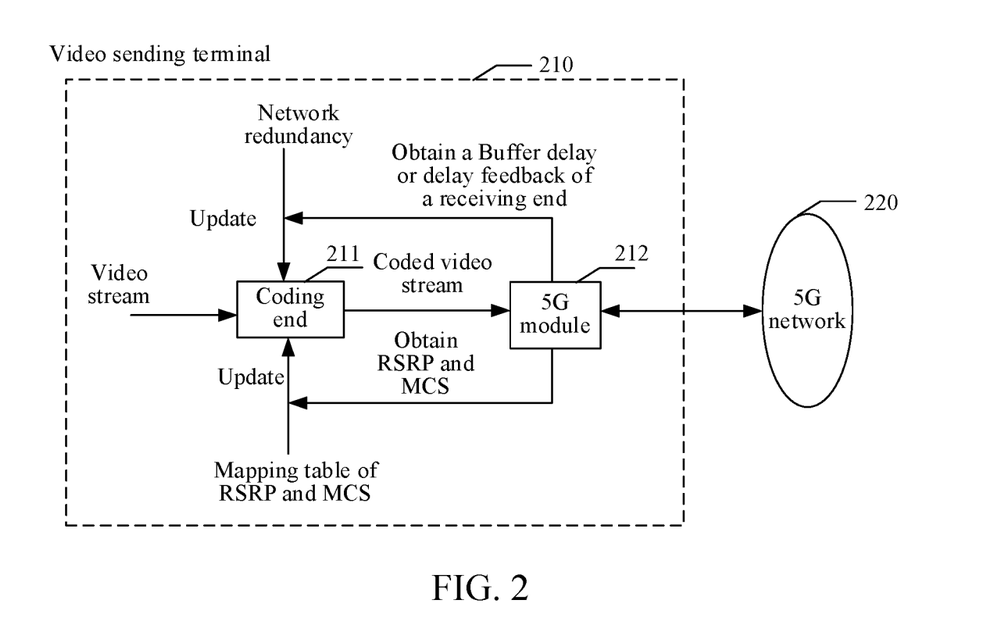
FIG. 2 shows a block diagram of a system architecture applying a technical solution of this application.

Specifically, referring to FIG. 2, FIG. 2 shows a block diagram of a system architecture applying a technical solution of this application.

Referring to FIG. 2, the system architecture includes a video sending terminal 210 and a network 220, and the video sending terminal 210 and the network 220 are in communication connection. The video sending terminal 210 includes a coding end 211 and a 5G module 212, a video stream is coded through the coding end 211, and the coded video stream coded through the coding end 211 is sent to the 5G module 212. In order to lower a transmission delay, during coding at the coding end 211, a target data volume of a key frame to be transmitted needs to be determined first. In order to determine a target data volume of a next key frame, the target data volume is specifically determined through a video coding method as follows.

A key frame of a video is typically an I frame, namely a frame coded via an intraframe coding technology in video coding, the frame may be decoded independently without reliance on other frames during decoding, thus the frame is large in size usually and has a difference from a frame coded via an interframe coding technology, and therefore the key frame of the video is referred to by the I frame in this application.

The video coding method provided by this application is described in detail below in combination with specific embodiments.

Figure 3:
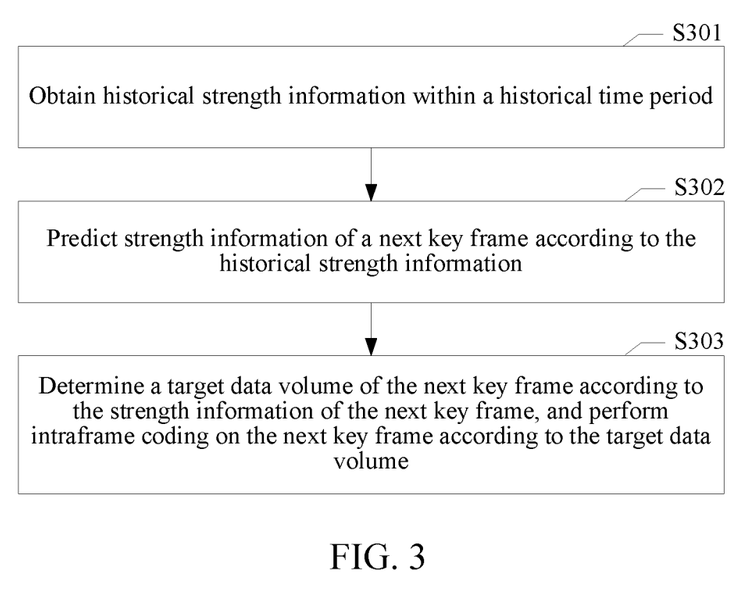
FIG. 3 shows a step flow of a video coding method provided by this embodiment of this application.

Referring to FIG. 3, FIG. 3 shows a step flow of a video coding method provided by this embodiment of this application. The video coding method may be executed by an electronic device shown in FIG. 12. This application discloses the video coding method, which may mainly include the following steps S301 to S303.

Step S301: Obtain, by a terminal, historical signal strength information within a historical time period, the historical signal strength information being used for representing a video transmission wireless network signal strength corresponding to a historical moment within the historical time period.

When the terminal performs uplink video stream transmission, the video coding method of this application starts to be executed in time T1 before the arrival of a next intraframe key frame (I frame). The specific video coding method is that the terminal obtains the historical signal strength information within the historical time period, where reference signal receiving power (RSRP) represents a network signal strength, and RSRP received within a time sequence of a nearest time window T2 is obtained first.

In some embodiments, the historical time period and a coding moment of a next key frame have a sliding time window with a preset time interval, and the time window will slide forwards over time. Accordingly, a video transmission network signal strength of a corresponding historical moment is obtained conveniently.

Step S302: Predict strength information of the next key frame according to the historical signal strength information, the strength information of the next key frame being used for representing a wireless network signal strength for transmitting the next key frame.

The strength information of the next key frame is predicted according to the corresponding historical signal strength information within a preset time window, RSRP of a key frame transmission moment is predicted according to an RSRP time sequence value received within the time window T2, prediction is performed by setting a plurality of corresponding RSRP values within one time period, a prediction result obtained accordingly is relatively stable, and if prediction is performed only with a single value, a situation of jitter will occur. Specifically, prediction of the RSRP of the next key frame may be performed through linear regression, zero-order hold, XGBOOST or a neural network model or the like.

In one embodiment, when the RSRP of the next key frame is predicted through the method of linear regression, specifically, first, an RSRP data set corresponding to historical frames is obtained; then a cluster is generated according to the RSRP data set corresponding to the historical frames; a linear regression coefficient is calculated according to the generated cluster at the same time; afterwards, a clustered linear regression function is obtained through the generated cluster and the linear regression coefficient; afterwards, a linear regression result of K times of clustering is calculated according to the obtained clustered linear regression coefficient; and finally, the RSRP of the next key frame is obtained according to the obtained linear regression result of the K times of clustering.

In one embodiment, when the RSRP of the next key frame is predicted through the method of zero-order hold, specifically, a continuous model is constructed based on RSRP corresponding to historical frames, the continuous model is discretized through a step response invariant method to obtain a zero-order hold discretized model, and then the discretized model is optimized by introducing calculation time delay to establish a zero-order hold discretized model; on the basis of the zero-order hold discretized model, a calculation time delay item and a disturbance item are introduced respectively to obtain a delay model and a disturbance model; on the basis of the disturbance model, an extended state observer is designed by adopting a state space method; a zero-order hold discretized state equation considering disturbance is established, and a disturbance state observer is designed based on this zero-order hold discretized state equation to estimate disturbance; and giving consideration to system robustness and a system dynamic property, a proper RSRP parameter is selected by adopting a direct zero-pole configuration method, so that the RSRP of the next key frame is obtained.

In one embodiment, when the RSRP of the next key frame is predicted through an XGBOOST algorithm, specifically, RSRP corresponding to historical frames is obtained, and a training data set is trained for learning by utilizing XGBOOST with the RSRP corresponding to the historical frames as a historical feature and with features affecting RSRP data and the historical feature as the training data set of XGBOOST, so that a prediction model is obtained; and RSRP of predicted time is predicted with the prediction model to obtain an RSRP predicted value of the next key frame.

In one embodiment, when the RSRP of the next key frame is predicted through a neural network model, specifically, continuous video frames are selected as training samples, frame-to-frame differences of the training samples are extracted, with the frame-to-frame differences as an input to an encoder in a generator model, neural network weights of the encoder and a decoder are obtained by training based on a loss function, and a predicted frame at the time when a value of the loss function is the minimum is obtained by solving, so that an RSRP predicted value of the next key frame is obtained.

Step S303: Determine a target data volume of the next key frame according to the strength information of the next key frame, and perform intraframe coding on the next key frame according to the target data volume.

Since an uplink data volume that may be borne by one uplink frame is specifically related to a signal strength from a terminal to a base station, the target data volume of the next key frame may be obtained according to the predicted strength information of the next key frame, and intraframe coding of the next key frame is performed through the determined target data volume.

Since a video stream includes multiple frames, the video stream comes frame by frame when transmitted, before the next key frame is to be coded, a coding size of this key frame is calculated in advance, and the coding size of this key frame calculated in advance refers to the target data volume of the next key frame. After the target data volume of the next key frame is determined, a value of a coding rate of an encoder is set, and then when this video frame is coded, the size of the coded key frame is a preset coding size. The target data volume at the moment enables transmission of the key frame to be completed within one uplink slot, thereby lowering the transmission delay.

In the technical solution provided by this embodiment of this application, the strength information of the next key frame is predicted through the historical signal strength information, and the target data volume of the next key frame is determined according to the predicted strength information of the next key frame. The target data volume is determined in advance before coding of the next key frame, then intraframe coding is performed on the next key frame according to the target data volume, and therefore transmission of the key frame may be completed within one uplink slot without waiting for one frame period, thereby reducing the transmission delay. In this application, a bit of image quality is sacrificed in exchange for the shorter delay, such that the transmission rate of the video stream is greatly increased.

By adaptively adjusting the size of the key frame, transmission of the key frame may be completed within an uplink slot of one 5G frame without waiting for another frame period of 5 ms. A coding range of a 1080P key frame is about 50 KB to 200 KB, and a data volume capable of being transmitted by one 5G uplink slot with no load is about 125 KB. It is feasible to perform adaptive transmission of the key frame according to the network state.

Figure 4:
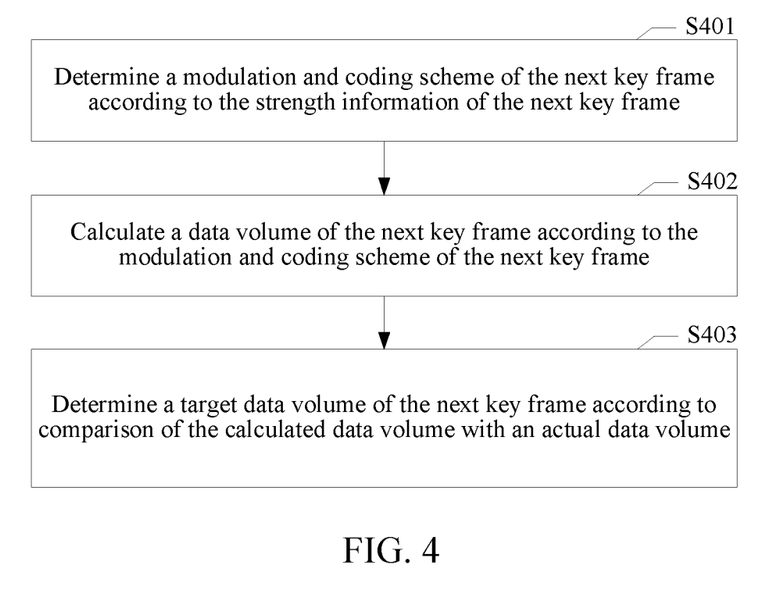
FIG. 4 shows a step flow of determining a target data volume of a next key frame according to strength information of the next key frame in an embodiment of this application.

Referring to FIG. 4, FIG. 4 shows a step flow of determining the target data volume of the next key frame according to the strength information of the next key frame in an embodiment of this application. In some embodiments, step S303 that the target data volume of the next key frame is determined according to the strength information of the next key frame may mainly include the following steps S401 to S403.

Step S401: Determine a modulation and coding scheme of the next key frame according to the strength information of the next key frame.

In wireless communication, a modulation and coding scheme (MCS) is generally used for describing selection of channel coding and constellation modulation during transmission in a physical layer. Generally, sent data will be processed via the MCS, and different MCSs may have different coding rates, thereby influencing a sent data volume that can be borne actually on the same radio resource block. In order to pre-determine the target data volume before coding of the next key frame, the modulation and coding scheme corresponding to the next key frame needs to be obtained first, and the modulation and coding scheme of the next key frame is determined through the strength information of the next key frame.

Step S402: Calculate the data volume of the next key frame according to the modulation and coding scheme of the next key frame.

As different modulation and coding schemes may have different coding rates and the different coding rates influence the sent data volume that can be borne actually on the same radio resource block, a corresponding coding rate is obtained by obtaining the modulation and coding scheme of the next key frame, and the data volume of the next key frame is correspondingly calculated through the coding rate.

Step S403: Determine the target data volume of the next key frame according to comparison of the calculated data volume with an actual data volume.

In order to guarantee that a video stream can be transmitted normally while lowering the transmission delay, comparison is required rather than directly using the calculated data volume as the target data volume of the next key frame, the calculated data volume and the actual data volume of the video stream are compared, and a proper data volume is selected as the target data volume, so that it is guaranteed that the video stream can be transmitted normally while lowering the transmission delay, without greatly lowering the video quality.

Accordingly, the target data volume of the next key frame is estimated through the strength information of the next key frame, the target data volume is pre-determined before coding of the next key frame, the calculated data volume needs to be compared with the actual data volume when the target data volume is determined, and the relatively proper data volume is selected as the target data volume, so that it is guaranteed that the video stream can be transmitted normally while lowering the transmission delay.

Figure 5:
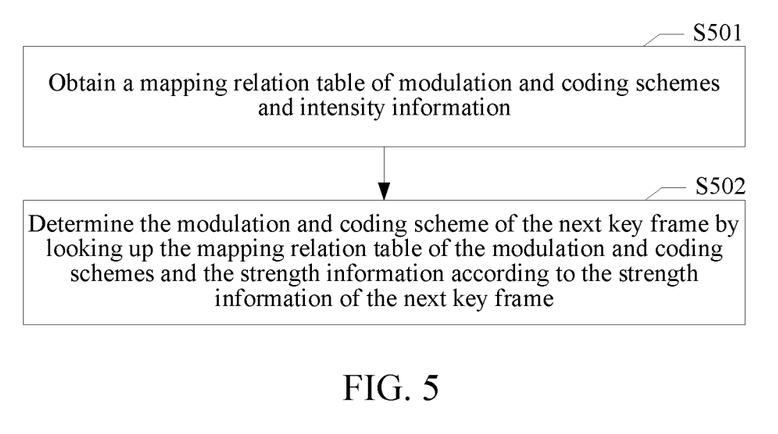
FIG. 5 shows a step flow of determining a modulation and coding scheme of a next key frame according to strength information of the next key frame in an embodiment of this application.

Referring to FIG. 5, FIG. 5 shows a step flow of determining the modulation and coding scheme of the next key frame according to the strength information of the next key frame in an embodiment of this application. In some embodiments, step S401 that the modulation and coding scheme of the next key frame is determined according to the strength information of the next key frame may mainly include the following steps S501 to S502.

Step S501: Obtain, by the terminal, a mapping relationship table of modulation and coding schemes and strength information.

The mapping relationship table of the modulation and coding schemes and the strength information is a mapping relationship table of MCSs and RSRP, which describes MCS levels corresponding to different RSRP bands.

Rules for determining MCS tables may be pre-configured, such that in an access process of the video sending terminal, the MCS tables used by channels may be determined according to the pre-configured rules. For example, the pre-configured rules may be determining the MCS tables used by all or part of the channels in the access process of the video sending terminal according to a current RSRP measured value.

As the current RSRP measured value of the video sending terminal may reflect the current user capability of the video sending terminal and current actual transmission performance of the video sending terminal, the MCS tables used by the channels in the random access process may be determined according to the current RSRP measured value to better meet current real-time performance requirements of the video sending terminal. Therefore, the video sending terminal may measure the RSRP in the access process to determine the MCS tables used by the channels in the access process according to a range where the current RSRP measured value is located. Further, after measuring the current RSRP measured value, the video sending terminal may send the current RSRP measured value to a base station to make the base station determine the MCS tables, matching the current RSRP measured value, used by the channels, such that the mapping relationship table of the MCSs and the RSRP may be obtained.

Step S502: Determine the modulation and coding scheme of the next key frame by looking up the mapping relationship table of the modulation and coding schemes and the strength information according to the strength information of the next key frame.

The modulation and coding scheme corresponding to the strength information of the next key frame is obtained by looking up the mapping relationship table of the modulation and coding schemes and the strength information. Specifically, the mapping relationship table of the modulation and coding schemes and the strength information is the mapping relationship table of the MCSs and the RSRP, and as for the correspondence of the MCSs and the RSRP, generally, RSRP in a certain interval corresponds to one MCS because the MCSs are discrete and the RSRP is continuous, so that one interval is established to correspond to one MCS.

After new RSRP, namely the strength information of the next key frame, is obtained, comparison is made. Since all historical RSRP is classified into corresponding MCSs, if the average distance between the new RSRP and all the RSRP in an MCS is the smallest, then the new RSRP belongs to that MCS, that is, the new RSRP has the smallest distance from the RSRP matching the historical MCSs. Assuming that the MCSs are 0 and 1 and there are much RSRP, the historical RSRP either corresponds to the MCS belonging to 0 or the MCS belonging to 1, the MCS being 0 corresponds to historical values of multiple RSRP, the MCS being 1 also corresponds to historical values of multiple RSRP, then, to judge which MCS the new RSRP belongs to, whether the new RSRP has the smallest average distance from all the historical RSRP corresponding to the MCS being 0 or all the historical RSRP corresponding to the MCS being 1 is judged, and if the new RSRP has the smallest average distance from all the RSRP corresponding to the MCS being 0, the new RSRP is classified into the class that the MCS is equal to 0, so that the modulation and coding scheme of the next key frame is determined, and the step that the modulation and coding scheme of the next key frame is determined by looking up the mapping relationship table of the modulation and coding schemes and the strength information according to the strength information of the next key frame is achieved.

Accordingly, the method of looking up the table is conducive to determining the modulation and coding scheme of the next key frame according to the obtained strength information. In addition, adjusting the coding scheme based on network awareness of the video sending terminal does not need to wait for feedback of a receiving end, so adjustment is in time relatively.

Figure 6:
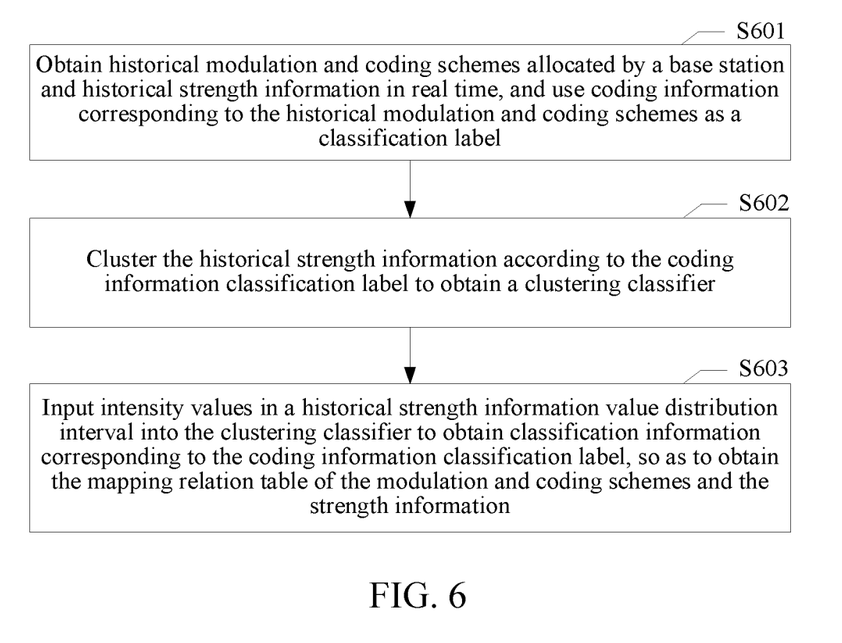
FIG. 6 shows a step flow of obtaining a mapping relationship table of modulation and coding schemes and strength information in an embodiment of this application.

Referring to FIG. 6, FIG. 6 shows a step flow of obtaining the mapping relationship table of the modulation and coding schemes and the strength information in an embodiment of this application. In some embodiments, as for obtaining the mapping relationship table of the modulation and coding schemes and the strength information, specifically, step S501: Obtain the mapping relationship table of the modulation and coding schemes and the strength information, which may mainly include the following steps S601 to S603.

Step S601: Obtain, by the terminal, historical modulation and coding schemes allocated by the base station and the historical signal strength information in real time, and use coded information corresponding to the historical modulation and coding schemes as a classification label, the historical modulation and coding schemes being used for representing modulation and coding schemes corresponding to historical moments.

Step S602: Cluster the historical signal strength information according to the coded information classification label to obtain a clustering classifier.

Step S603: Input strength values in a historical signal strength information value distribution interval into the clustering classifier to obtain classification information corresponding to the coded information classification label to obtain the mapping relationship table of the modulation and coding schemes and the strength information.

The terminal records MCS information allocated by the base station and RSRP information during recent uplink transmission obtained from a 5G module to establish the mapping relationship table of the MCSs and the RSRP. As for a specific table establishment method, a clustering method may be adopted, such that historical real MCSs have the smallest average distance from the MCSs obtained by looking up the mapping relationship table utilizing the RSRP.

Accordingly, obtaining the modulation and coding schemes allocated by the base station and the strength information is conducive to establishing the mapping relationship table of the modulation and coding schemes and the strength information.

If the terminal cannot obtain the MCS information allocated by the base station from the 5G module in real time, offline measurement may be conducted by utilizing the measures such as simulation or testing, and the mapping relationship table of the MCSs and the RSRP is established in advance and stored in the terminal.

Figure 7:
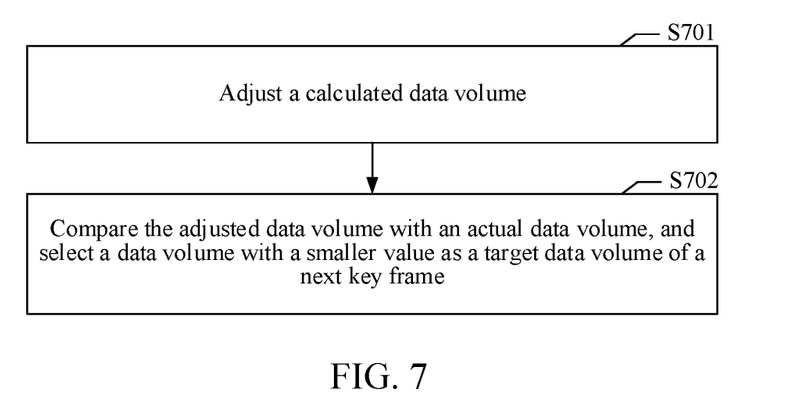
FIG. 7 shows a step flow of determining a target data volume of a next key frame according to comparison of a calculated data volume with an actual data volume in an embodiment of this application.

Referring to FIG. 7, FIG. 7 shows a step flow of determining the target data volume of the next key frame according to comparison of the calculated data volume with the actual data volume in an embodiment of this application. In some embodiments, step S403 that the target data volume of the next key frame is determined according to comparison of the calculated data volume and the actual data volume may mainly include the following steps S701 to S702.

Step S701: Adjust, by the terminal, the calculated data volume.

The terminal adjusts the calculated data volume after calculating the data volume, and specifically, adjustment is performed through a coefficient to ensure that the obtained data volume can be transmitted normally.

Step S702: Compare the adjusted data volume with the actual data volume, and select a data volume with a smaller value as the target data volume of the next key frame.

The adjusted data volume is compared with the actual data volume of the video stream, and if the adjusted data volume is less than the actual data volume, the adjusted data volume is selected as the target data volume of the next key frame, and intraframe coding is performed on the next key frame according to the target data volume. If the actual data volume is less than the adjusted data volume, the actual data volume is selected as the target data volume of the next key frame, and intraframe coding is performed on the next key frame according to the target data volume.

Accordingly, the adjusted data volume and the actual data volume are compared, the data volume with the smaller value is selected as the target data volume of the next key frame, selecting the smaller data volume as the target data volume may greatly lower the transmission delay, and additionally, it is guaranteed that the video stream can be transmitted normally while the transmission delay is lowered.

In some embodiments, after the target data volume of the next key frame is determined, further adjustment may be performed through quality parameters to reduce a bit rate while guaranteeing the video quality. Specifically, a current quality parameter value is obtained; and whether an output bit rate corresponding to the current quality parameter value meets the requirement of a preset threshold value is judged, if yes, no adjustment is required, and if not, the current quality parameter value is adjusted as a target quality parameter value.

The quality parameter (QP) is one of main parameters for performing video coding. When the minimum value 0 of the QP is used, it represents that qualification of a video is the finest, and on the contrary, when the maximum value of the QP is used, it represents that qualification of the video is the roughest. Typically, in order to enable video contents to meet the requirements of transmitting and playing on the Internet, video content providers such as a video website need to perform a transcoding operation on original videos. Video transcoding is nearly the basis of all Internet video services, including livestreaming, on-demand unicasting and the like. The goal of video transcoding is simple, namely obtaining smooth and clear video data. However, smoothness and clarity are two contradictory requirements. The lower the bit rate is, the better the smoothness is, and on the contrary, clarity requires the higher bit rate. Video transcoding needs to give priority to smooth playing. On this basis, the picture quality and a compression ratio of transcoding are improved as much as possible. The bit rate refers to a data bit number conveyed within unit time during data transmission, and typically uses kbps as the unit, namely "kilobit per second". Typically, for one video, a picture is not clear when the bit rate is too low; and when the bit rate is too high, the video cannot be smoothly played on a network.

When the video is coded by adopting the current quality parameter value, and an average bit rate or instantaneous bit rate of a video output after coding fails to meet preset requirements, the current quality parameter value may be adjusted to obtain the target quality parameter value. Typically, the bit rate of the output video is inversely proportional to a quality parameter value adopted by a video coder, the larger the quality parameter value, the smaller the bit rate of the video output after transcoding, and the smaller the quality parameter value, the larger the bit rate of the video output after transcoding, so that the quality parameter value of the video coder may be adjusted according to a comparison result of the bit rate of the video output after transcoding with the preset requirements. For example, when the bit rate of the video output after transcoding is greater than the preset requirements, it shows that the current quality parameter value is small and may be increased by a certain value correspondingly to obtain the target quality parameter value.

Figure 8:
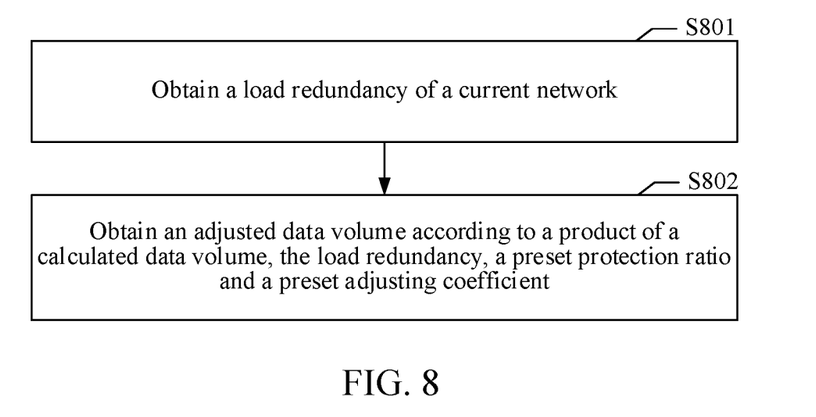
FIG. 8 shows a step flow of adjusting a calculated data volume in an embodiment of this application.

Referring to FIG. 8, FIG. 8 shows a step flow of adjusting the calculated data volume in an embodiment of this application. In some embodiments, step S701 of adjusting the calculated data volume may mainly include the following steps S801 to S802.

Step S801: Obtain, by the terminal, a load redundancy of a current network.

The load redundancy of the current network represents a state of the current network, and by obtaining the state of the current network, subsequent adjustment of the data volume is facilitated.

The load redundancy of the current network may be dynamically adjusted according to a packet loss condition and an estimated result of a network bandwidth.

Step S802: Obtain the adjusted data volume according to a product of the calculated data volume, the load redundancy, a preset protection ratio and a preset adjusting coefficient.

With respect to setting of the protection ratio P, for example, a maximum target data volume is 100 k, as a deviation exists in a prediction process, in order to prevent that data cannot be transmitted normally due to some accidents, by setting a protection ratio, such as 90%, the target data volume is lowered to 100*90% for transmission by setting the protection ratio, the target data volume may be transmitted normally even when there is a deviation during prediction, and thus setting the protection ratio is to lower the influence of the deviation on a result at last, thereby eliminating the influence of the prediction deviation.

Accordingly, considering the load redundancy of the current network is conducive to obtaining the adjusted data volume.

In some embodiments, when the next key frame uses forward error correction coding, the preset adjusting coefficient is 1/(1+R), where R represents a redundancy rate of forward error correction coding; and when the next key frame does not use forward error correction coding, the preset adjusting coefficient is 1.

As the method of forward error correction coding is an FEC coding method, and when the next key frame is coded, a product will be larger, adjustment is performed through the preset adjusting coefficient to obtain a target data size that can be transmitted.

Accordingly, by adopting different coding methods, the preset adjusting coefficient is set to be different to adapt to different application scenarios.

Figure 9:
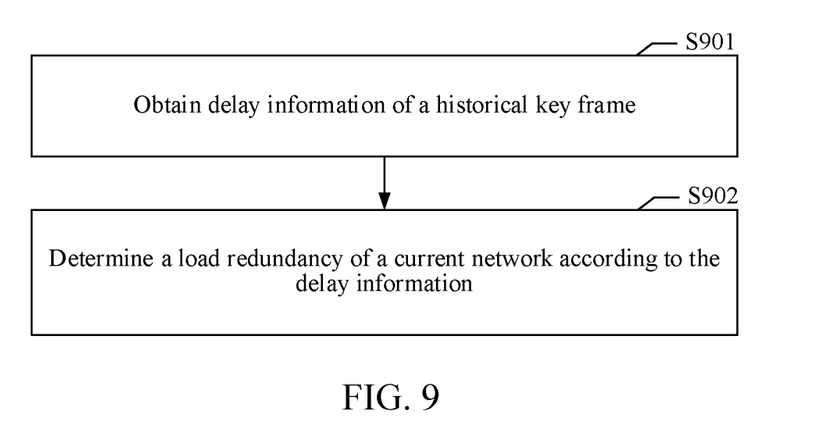
FIG. 9 shows a step flow of obtaining a load redundancy of a current network in an embodiment of this application.

Referring to FIG. 9, FIG. 9 shows a step flow of obtaining the load redundancy of the current network in an embodiment of this application. In some embodiments, step S801 of obtaining the load redundancy of the current network may mainly include the following steps S901 to S902.

Step S901: Obtain delay information of a historical key frame.

The current network state is determined by using the delay information of the historical key frame as feedback.

Step S902: Determine the load redundancy of the current network according to the delay information.

The load redundancy of the current network is obtained through the delay information of the historical key frame, which is conducive to obtaining a relatively accurate load redundancy of the current network and obtaining a relatively accurate target data volume.

In some embodiments, the load redundancy of the current network is determined according to the delay information, that is, the video sending terminal performs real-time statistics on a network transmission state and dynamically adjusts the load redundancy in real time, specifically including: counting network round-trip time of N continuous data packets within a period of time to obtain an initial average value and a standard deviation of data packet round-trip time within the period of time; determining a time threshold value by counting the round-trip time of the continuous data packets within the period of time; obtaining round-trip time of a current single data packet transmitted by a sending end; comparing the round-trip time of the current data packet with the time threshold value obtained by counting the transmission delay of the continuous data packets before that data packet; judging, if a value of the round-trip time of the current data packet is greater than or equal to the time threshold value, which represents that the round-trip time of the data packet is too long, that the current data packet is lost in the network transmission process, thus recording one time of packet loss; using a sliding window method if the value of the round-trip time of the current data packet is less than the time threshold value, which represents that the round-trip time of the data packet is normal, in which a window size is set as M, every time confirmation information of a new data packet is obtained, earliest round-trip time in a window is removed, a new result is added into the window, and the round-trip time of the data packets and the loss condition of the data packets are monitored in real time, so that a packet loss rate result is obtained; obtaining an average value and a standard deviation of the data packet loss ratio within the period of time according to the statistics of packet loss rates of N times of data packet transmission; calculating a reference ratio for adjusting the load redundancy of the current network; adjusting redundancy of the video sending terminal according to the reference ratio for adjusting the redundancy, and updating the number of data packets and the number of redundancy packets; and using the sliding window method, in which the window size is set as M, every time a new packet loss rate is obtained, earliest packet loss rate data in the window are removed, a new result is added into the window, and the network condition is monitored in real time.

Accordingly, the network condition is accurately judged and the network condition within a short period is predicted by adopting real-time continuous statistics based on the video sending terminal, which is used as the basis for dynamically adjusting the load redundancy. Finally, consumption of the network bandwidth by redundancy packets is reduced while a system decouples the network packet loss phenomenon, and the purposes of improving the network utilization and sending efficiency are achieved.

In addition, the network condition is estimated in real time by performing statistical operation on the packet loss situation based on the video sending terminal, the network packet loss condition is counted at the video sending terminal, and latency of a statistical process caused by a feedback process of a receiving end is reduced. A transmission result of the data packets may be obtained within one round-trip time by counting the packet loss rate through the video sending terminal, a packet loss statistical result is obtained when a packet loss rate counting period is ended, whereas the receiving end requires an additional feedback and handling process. In addition, the average value and the standard deviation for verification are updated through the sliding window method in the online statistical verification process, so that the statistical process is timely. Besides, compared with a transmission method in which a video frame is the unit and the total numbers of data packets in each group are different after coding, stable and efficient transmission of the data packets may be achieved through a transmission method with a constant rate, on the one hand, the data volume entering the network within unit time may be guaranteed to be constant, and on the other hand, latency generated by different data packet sending intervals is lowered.

In some embodiments, step S901 of obtaining the delay information of the historical key frame includes:
using delay information fed back by the receiving end as the delay information of the historical key frame, or using delay information, obtained via monitoring, of clearing transmitting cache region as the delay information of the historical key frame.

Accordingly, the delay information may be obtained based on the delay fed back by the receiving end or the delay information of the clearing transmitting cache region observed in the 5G module, the delay information is conveniently obtained, and thus the obtained delay information is more accurate in data volume.

Figure 10:
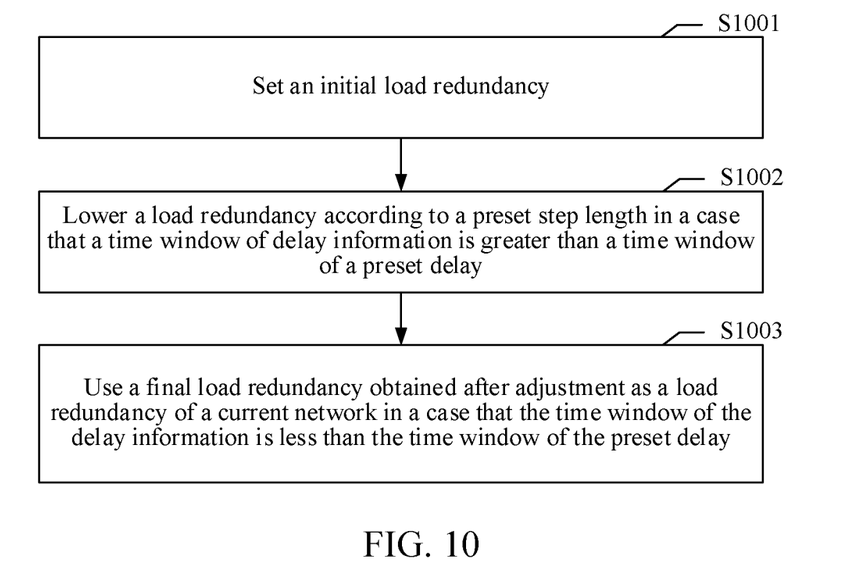
FIG. 10 shows a step flow of determining a load redundancy of a current network according to delay information in an embodiment of this application.

Referring to FIG. 10, FIG. 10 shows a step flow of determining the load redundancy of the current network according to the delay information in an embodiment of this application. In some embodiments, step S902 of determining the load redundancy of the current network according to the delay information may mainly include the following steps S1001 to S1003.

Step S1001: Set an initial load redundancy.

The initial load redundancy is set as a default value, such as 80%.

Step S1002: Lower the load redundancy according to a first preset step length when a time window of the delay information is greater than a time window of a preset delay, and use a final load redundancy obtained after adjustment as the load redundancy of the current network.

For example, when the time window of the delay information is greater than the time window of the preset delay, such as a 5 ms difference, the load redundancy is lowered according to a certain step length, and when the time window of the delay information is equal to the time window of the preset delay after adjustment, the final load redundancy obtained after adjustment is used as the load redundancy of the current network.

Step S1003: Increase the load redundancy according to a second preset step length when the time window of the delay information is less than the time window of the preset delay, and use a final load redundancy obtained after adjustment as the load redundancy of the current network, where the first preset step length is greater than the second preset step length.

The load redundancy is increased according to the second preset step length when the time window of the delay information is less than the time window of the preset delay, such as a 5 ms difference, and when the time window of the delay information is equal to the time window of the preset delay after adjustment, the final load redundancy obtained after adjustment is used as the load redundancy of the current network.

Accordingly, the load redundancy is adjusted by setting the different step lengths according to the different delay information to achieve rapid adjustment of the load redundancy, and the load redundancy is dynamically adjusted to obtain the relatively accurate load redundancy of the current network, which is conducive to obtaining the relatively accurate target data volume.

In some embodiments, the time window of the preset delay is determined according to a forward reference frame transmission delay, or is determined according to an empty load network environment test value.

A group of pictures (GOP) refers to a group of continuous pictures in a video, which is used as a frame group in video coding. In low-delay video transmission, typically in one GOP, the first frame after coding is an I frame, subsequent frames are forward reference frames, namely P frames, and the time window of the preset delay may be determined according to delays of the P frames. In addition, the window of the preset delay may also be set according to a network environment corresponding to no load.

Accordingly, in combination with the actual delay situation, the time window of the preset delay is set more reasonably.

In some embodiments, the method further includes: obtaining, by the terminal, one media frame, placing the obtained media frame into a buffering queue, determining a total number of media frames in the buffering queue and a total length of media frames sent from previous calculation of a bandwidth to current time, and calculating a current bandwidth and a current network congestion grade according to the total number of the media frames and the total length of the media frames; judging a code stream adjusting type according to the current bandwidth and the network congestion grade, and calculating a coding adjustment parameter, in which not only is calculation of an adjusted code stream value needed, but also calculation of an adjusted frame frequency value is needed, accordingly, a frame frequency is correspondingly lowered when a code stream is reduced, because when the code stream is relatively low, an over-high frame rate has little significance, lowering the frame frequency according to a ratio may effectively reduce the problem that the picture quality is poorer due to reduction of the code stream, when the adjustment type of the code stream is reduction, a code stream value that requires to be reduced is calculated based on the current bandwidth, and thus the maximum bandwidth utilization is reached as much as possible while smoothness is guaranteed; and finally, adjusting, by the terminal, a coding configuration based on the calculated coding adjustment parameter. Accordingly, the coding configuration is adjusted adaptive to the bandwidth, sending of invalid media frames is reduced, and the smoothness is improved.

Although the steps of the method in this application are described in a specific order in the accompanying drawings, this does not require or imply that these steps must be performed in the specific order, or that all the steps shown must be performed to achieve the desired results. Additionally, or alternatively, some steps may be omitted, a plurality of steps may be combined into one step for execution, and/or one step may be decomposed into a plurality of steps for execution, and the like.

Figure 11:
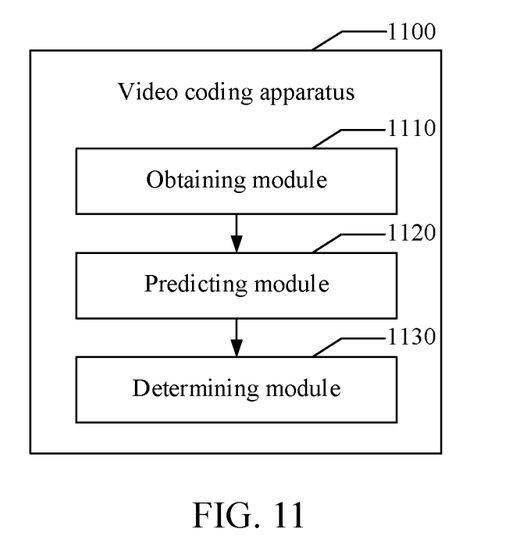
FIG. 11 shows a structural block diagram of a video coding apparatus provided by this embodiment of this application.

An apparatus embodiment of this application is introduced below, which may be used for executing the video coding method in the above embodiments of this application. FIG. 11 shows a structural block diagram of a video coding apparatus provided by this embodiment of this application. As shown in FIG. 11, the video coding apparatus 1100 includes:

an obtaining module 1110, configured to obtain historical signal strength information within a historical time period, the historical signal strength information being used for representing a video transmission wireless network signal strength corresponding to each historical moment within the historical time period;

a predicting module 1120, configured to predict strength information of a next key frame according to the historical signal strength information, the strength information of the next key frame being used for representing a wireless network signal strength for transmitting the next key frame; and a determining module 1130, configured to determine a target data volume of the next key frame according to the strength information of the next key frame, and perform intraframe coding on the next key frame according to the target data volume.

In some embodiments, based on the above technical solution, the determining module 1130 includes:

a first determining unit, configured to determine a modulation and coding scheme of the next key frame according to the strength information of the next key frame;

a calculating unit, configured to calculate a data volume of the next key frame according to the modulation and coding scheme of the next key frame; and a second determining unit, configured to determine the target data volume of the next key frame according to comparison of the calculated data volume with an actual data volume.

In some embodiments, based on the above technical solution, the first determining unit is configured to obtain a mapping relationship table of modulation and coding schemes and strength information; and determine the modulation and coding scheme of the next key frame by looking up the mapping relationship table of the modulation and coding schemes and the strength information according to the strength information of the next key frame.

In some embodiments, based on the above technical solution, the first determining unit is configured to obtain historical modulation and coding schemes allocated by a base station and the historical signal strength information in real time, and use coded information corresponding to the historical modulation and coding schemes as a classification label, the historical modulation and coding schemes being used for representing modulation and coding schemes corresponding to historical moments; cluster the historical signal strength information according to the coded information classification label to obtain a clustering classifier; and input strength values in a historical signal strength information value distribution interval into the clustering classifier to obtain classification information corresponding to the coded information classification label to obtain the mapping relationship table of the modulation and coding schemes and the strength information.

In some embodiments, based on the above technical solution, the second determining unit is configured to adjust the calculated data volume; and compare the adjusted data volume with the actual data volume, and select a data volume with a smaller value as the target data volume of the next key frame.

In some embodiments, based on the above technical solution, the second determining unit is configured to obtain a load redundancy of a current network; and obtain the adjusted data volume according to a product of the calculated data volume, the load redundancy, a preset protection ratio and a preset adjusting coefficient.

In some embodiments, based on the above technical solution, the second determining unit is configured for the following: when the next key frame uses forward error correction coding, the preset adjusting coefficient is $1/(1+R)$, where R represents a redundancy rate of forward error correction coding; and when the next key frame does not use forward error correction coding, the preset adjusting coefficient is 1.

In some embodiments, based on the above technical solution, the second determining unit is configured to obtain delay information of a historical key frame; and determine the load redundancy of the current network according to the delay information.

In some embodiments, based on the above technical solution, the second determining unit is configured to use delay information fed back by a receiving end as the delay information of the historical key frame, or use delay information, obtained via monitoring, of clearing transmitting cache region as the delay information of the historical key frame.

In some embodiments, based on the above technical solution, the second determining unit is configured to set an initial load redundancy; lower the load redundancy according to a first preset step length when a time window of the delay information is greater than a time window of a preset delay, and use a final load redundancy obtained after adjustment as the load redundancy of the current network; and increase the load redundancy according to a second preset step length when the time window of the delay information is less than the time window of the preset delay, and use a final load redundancy obtained after adjustment as the load redundancy of the current network; where the first preset step length is greater than the second preset step length.

In some embodiments, based on the above technical solution, in the second determining unit, the time window of the preset delay is determined according to a forward reference frame transmission delay, or is determined according to an empty load network environment test value.

In some embodiments, based on the above technical solution, in the obtaining module, the historical time period and a coding moment of the next key frame have a sliding time window with a preset time interval.

Specific details of the video coding apparatus provided in the embodiments of this application have been described in detail in the corresponding method embodiment, which will not be repeated here.

Figure 12:
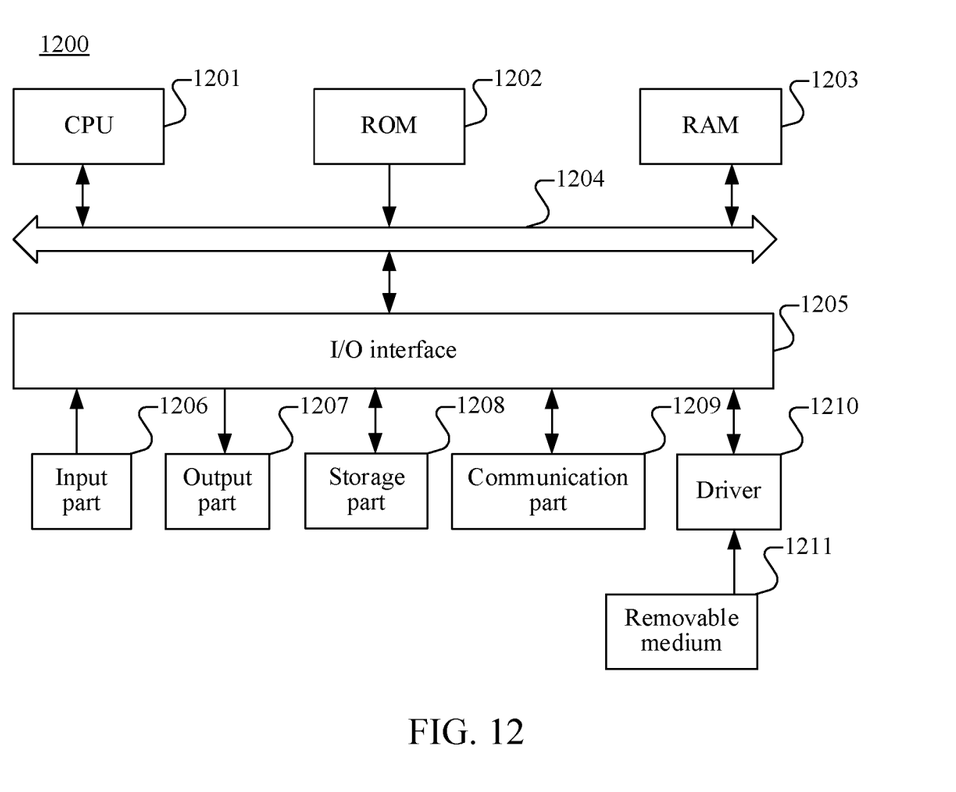
FIG. 12 shows a structural block diagram of a computer system of an electronic device suitable for implementing this embodiment of this application.

FIG. 12 shows a structural block diagram of a computer system of an electronic device used for implementing this embodiment of this application.

The computer system 1200 of the electronic device shown in FIG. 12 is only an example, and should not limit the function and scope of use of this embodiment of this application.

As shown in FIG. 12, the computer system 1200 includes a central processing unit (CPU) 1201, which may execute various appropriate actions and processing according to programs stored in a read-only memory (ROM) 1202 or programs loaded from a storage part 1208 onto a random access memory (RAM) 1203. In random access memory 1203, various programs and data required for system operations are further stored. The central processing unit 1201, the read-only memory 1202 and the random access memory 1203 are connected with one another through bus 1204. An input/output interface (I/O interface) 1205 is also connected to the bus 1204.

The following components are connected to the input/output interface 1205: an input part 1206 including a keyboard, a mouse and the like; an output part 1207 including a cathode ray tube (CRT), a liquid crystal display (LCD), a loudspeaker and the like; a storage part 1208 including a hard disk and the like; and a communication part 1209 including a local area network card, a network interface card of a modem and the like. The communication part 1209 performs communication processing by using a network such as the Internet. A driver 1210 is further connected to the input/output interface 1205 as required. A removable medium 1211, such as a magnetic disk, an optical disk, a magneto-optical disk and a semiconductor memory, are installed on the driver 1210 as required, so that computer programs read from it can be installed into the storage part 1208 as required.

In particular, according to this embodiment of this application, the process described in the flow chart of each method can be implemented as a computer software program For example, this embodiment of this application includes a computer program product, the computer program product includes a computer program carried on a computer-readable medium, and the computer program includes program codes used for performing the methods shown in the flowcharts. In such an embodiment, the computer program may be downloaded from the network through the communication part 1209 and installed, and/or installed from the removable medium 1211. The computer program, when executed by the central processing unit 1201, executes various functions defined in the system of this application.

The computer-readable medium shown in this embodiment of this application may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination of the above. More specific examples of the computer-readable storage medium may include but are not limited to: electrical connections with one or more wires, a portable computer magnetic disk, a hard disk, a random access memory (RAM), a read-only memory (ROM), an erasable programmable read only memory (EPROM), a flash memory, an optical fiber, a portable compact disc read-only memory (CD-ROM), an optical storage device, a magnetic storage device or any suitable combination of the above. In this application, the computer-readable storage medium may be any tangible medium containing or storing a program, and the program may be used by or used in combination with an instruction execution system, an apparatus, or a device. In this application, the computer-readable signal medium may include a data signal propagated in a baseband or as part of a carrier wave, in which a computer-readable program code is carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium that may send, propagate, or transmit a program for use by or in combination with an instruction execution system, an apparatus, or a device. The program codes contained on the computer-readable medium may be transmitted by any suitable medium, including but not limited to wireless, wired, etc., or any suitable combination of the above.

The flow charts and block diagrams in the accompanying drawings illustrate possible system architectures, functions and operations that may be implemented by a system, a method, and a computer program product according to various embodiments of this application. In this regard, each box in a flow chart or a block diagram may represent a module, a program segment, or a part of code. The module, the program segment, or the part of code includes one or more executable instructions used for implementing designated logic functions. In some alternative embodiments, functions marked in the blocks may also occur in an order different from that marked in the accompanying drawings. For example, actually two boxes shown in succession may be performed basically in parallel, and sometimes the two boxes may be performed in a reverse sequence. This is determined by a related function. Each box in a block diagram and/or a flow chart and a combination of boxes in the block diagram and/or the flow chart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the embodiments of this application, the features and functions of two or more modules or units described above may be specifically implemented in one module or unit. On the contrary, the features and functions of one module or unit described above may be further divided to be embodied by a plurality of modules or units.

According to the foregoing descriptions of the embodiments, a person skilled in the art may readily understand that the embodiments described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

Other embodiments of this application will be apparent to a person of skilled in the art from consideration of the specification and practice of the invention disclosed herein. This application is intended to cover any variations, uses, or adaptations of this application following the general principles thereof and including such departures from this application as come within known or customary practice in the art.

It is to be understood that this application is not limited to the precise structures described above and shown in the accompanying drawings, and various modifications and changes can be made without departing from the scope of this application. It is intended that the scope of this application is only limited by the appended claims.

What is claimed is:

1. A video coding method, executed by an electronic device, comprising:
   obtaining historical signal strength information within a historical time period, the historical signal strength information representing a video transmission wireless network signal strength corresponding to each moment of the historical time period;
   predicting strength information of a next key frame according to the historical signal strength information, the strength information of the next key frame representing a wireless network signal strength for transmitting the next key frame;
   determining a modulation and coding scheme of the next key frame according to the strength information of the next key frame;
   calculating a data volume of the next key frame according to the modulation and coding scheme of the next key frame, to obtain a calculated data volume;
   adjusting the calculated data volume, to obtain an adjusted data volume;
   comparing the adjusted data volume with an actual data volume, and selecting a data volume with a smaller value as a target data volume of the next key frame; and
   performing intraframe coding on the next key frame according to the target data volume.

2. The video coding method according to claim 1, wherein the determining the modulation and coding scheme of the next key frame according to the strength information of the next key frame, comprises:
   obtaining a mapping relationship table of modulation and coding schemes and strength information; and
   determining the modulation and coding scheme of the next key frame by looking up the mapping relationship table of the modulation and coding schemes and the strength information according to the strength information of the next key frame.

3. The video coding method according to claim 2, wherein the obtaining a mapping relationship table of modulation and coding schemes and strength information, comprises:
   obtaining historical modulation and coding schemes allocated by a base station and the historical signal strength information in real time, and using coded information corresponding to the historical modulation and coding schemes as a classification label, the historical modulation and coding schemes representing modulation and coding schemes corresponding to historical moments;
   clustering the historical signal strength information according to the coded information classification label to obtain a clustering classifier; and
   inputting strength values in a historical signal strength information value distribution interval into the clustering classifier to obtain classification information corresponding to the coded information classification label to obtain the mapping relationship table of the modulation and coding schemes and the strength information.

4. The video coding method according to claim 1, wherein the adjusting the calculated data volume comprises:
   obtaining a load redundancy of a current network; and
   obtaining the adjusted data volume according to a product of the calculated data volume, the load redundancy, a preset protection ratio and a preset adjusting coefficient.

5. The video coding method according to claim 4, wherein when the next key frame uses forward error correction coding, the preset adjusting coefficient is $1/(1+R)$, wherein R represents a redundancy rate of forward error correction coding; and
   when the next key frame does not use forward error correction coding, the preset adjusting coefficient is 1.

6. The video coding method according to claim 4, wherein the obtaining a load redundancy of a current network, comprises:
   obtaining delay information of a historical key frame; and
   determining the load redundancy of the current network according to the delay information.

7. The video coding method according to claim 6, wherein the obtaining delay information of a historical key frame, comprises:
   using delay information fed back by a receiving end as the delay information of the historical key frame, or using delay information obtained via monitoring, of clearing transmitting cache region as the delay information of the historical key frame.

8. The video coding method according to claim 6, wherein the determining the load redundancy of the current network according to the delay information, comprises:
   setting an initial load redundancy;
   lowering the load redundancy according to a first step length when a time window of the delay information is greater than a time window of a delay, and using a final load redundancy obtained after adjustment as the load redundancy of the current network; and
   increasing the load redundancy according to a second step length when the time window of the delay information is less than the time window of the delay, and using a final load redundancy obtained after adjustment as the load redundancy of the current network,
   wherein the first step length is greater than the second step length.

9. The video coding method according to claim 8, wherein the time window of the preset delay is determined according to a forward reference frame transmission delay, or is determined according to an empty load network environment test value.

10. The video coding method according to claim 1, wherein the historical time period and a coding moment of the next key frame have a sliding time window with a time interval.

11. A non-transitory computer-readable medium, storing a computer program thereon, the computer program, when executed by a processor, causing the processor to implement:
   obtaining historical signal strength information within a historical time period, the historical signal strength information representing a video transmission wireless network signal strength corresponding to each moment of the historical time period;
   predicting strength information of a next key frame according to the historical signal strength information, the strength information of the next key frame representing a wireless network signal strength for transmitting the next key frame;

determining a modulation and coding scheme of the next key frame according to the strength information of the next key frame;

calculating a data volume of the next key frame according to the modulation and coding scheme of the next key frame, to obtain a calculated data volume;

adjusting the calculated data volume, to obtain an adjusted data volume;

comparing the adjusted data volume with an actual data volume, and selecting a data volume with a smaller value as a target data volume of the next key frame; and performing intraframe coding on the next key frame according to the target data volume.

12. The computer-readable medium according to claim 11, wherein the determining the modulation and coding scheme of the next key frame according to the strength information of the next key frame, comprises:

obtaining a mapping relationship table of modulation and coding schemes and strength information; and determining the modulation and coding scheme of the next key frame by looking up the mapping relationship table of the modulation and coding schemes and the strength information according to the strength information of the next key frame.

13. The computer-readable medium according to claim 12, wherein the obtaining a mapping relationship table of modulation and coding schemes and strength information, comprises:

obtaining historical modulation and coding schemes allocated by a base station and the historical signal strength information in real time, and using coded information corresponding to the historical modulation and coding schemes as a classification label, the historical modulation and coding schemes representing modulation and coding schemes corresponding to historical moments;

clustering the historical signal strength information according to the coded information classification label to obtain a clustering classifier; and inputting strength values in a historical signal strength information value distribution interval into the clustering classifier to obtain classification information corresponding to the coded information classification label to obtain the mapping relationship table of the modulation and coding schemes and the strength information.

14. The computer-readable medium according to claim 11, wherein the adjusting the calculated data volume comprises:

obtaining a load redundancy of a current network; and obtaining the adjusted data volume according to a product of the calculated data volume, the load redundancy, a preset protection ratio and a preset adjusting coefficient.

15. The computer-readable medium according to claim 14, wherein when the next key frame uses forward error correction coding, the preset adjusting coefficient is 1/(1+R), wherein R represents a redundancy rate of forward error correction coding; and when the next key frame does not use forward error correction coding, the preset adjusting coefficient is 1.

16. The computer-readable medium according to claim 14, wherein the obtaining the load redundancy of the current network comprises:

obtaining delay information of a historical key frame; and determining the load redundancy of the current network according to the delay information.

17. The computer-readable medium according to claim 16, wherein the obtaining delay information of the historical key frame comprises:

using delay information fed back by a receiving end as the delay information of the historical key frame, or using delay information obtained via monitoring, of clearing transmitting cache region as the delay information of the historical key frame.

18. The computer-readable medium according to claim 16, wherein the determining the load redundancy of the current network according to the delay information comprises:

setting an initial load redundancy;

lowering the load redundancy according to a first step length when a time window of the delay information is greater than a time window of a delay, and using a final load redundancy obtained after adjustment as the load redundancy of the current network; and increasing the load redundancy according to a second step length when the time window of the delay information is less than the time window of the delay, and using a final load redundancy obtained after adjustment as the load redundancy of the current network, wherein the first step length is greater than the second step length.

19. An electronic device, comprising:

a processor; and a memory, configured to store executable instructions of the processor;

the processor being configured to execute the executable instructions and perform:

obtaining historical signal strength information within a historical time period, the historical signal strength information representing a video transmission wireless network signal strength corresponding to each moment of the historical time period;

predicting strength information of a next key frame according to the historical signal strength information, the strength information of the next key frame representing a wireless network signal strength for transmitting the next key frame;

determining a modulation and coding scheme of the next key frame according to the strength information of the next key frame;

calculating a data volume of the next key frame according to the modulation and coding scheme of the next key frame, to obtain a calculated data volume;

adjusting the calculated data volume, to obtain an adjusted data volume;

comparing the adjusted data volume with an actual data volume, and selecting a data volume with a smaller value as a target data volume of the next key frame; and performing intraframe coding on the next key frame according to the target data volume.

20. The electronic device according to claim 19, wherein the determining the modulation and coding scheme of the next key frame according to the strength information of the next key frame, comprises:

obtaining a mapping relationship table of modulation and coding schemes and strength information; and determining the modulation and coding scheme of the next key frame by looking up the mapping relationship table of the modulation and coding schemes and the strength information according to the strength information of the next key frame.

* * * * *